UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRUNING, OF HÖCHST-ON-THE-MAIN, GERMANY, A CORPORATION OF GERMANY.

BROWN VAT-DYE.

No. 872,085.     Specification of Letters Patent.     Patented Nov. 26, 1907.

Application filed July 24, 1907. Serial No. 385,311.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Making a New Brown Vat-Dyestuff, of which the following is a specification.

I have found a new brown vat dyestuff having the formula:

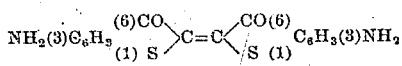

which is a brown powder, insoluble in water, alkalies, dilute acids, soluble in concentrated sulfuric acid with a blue color, soluble with great difficulty in hot nitrobenzene with an orange brown color; it is reduced by alkaline reducing agents, for instance, an alkaline hydrosulfite solution to a leuco compound and dyes from this solution cotton and wool in brown shades.

This vat dyestuff may be obtained, for instance, by heating meta-amidophenylthioglycollic-ortho-carboxylic acid having the formula:

or its acidyl derivatives, for instance

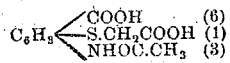

with alkali hydrates and by oxidizing the leuco bodies, meta-amidoöxythionaphthene carboxylic acid or meta-amidoöxythionaphthene.

The parent material, for instance, the meta-acetylamidophenylthioglycollic acid

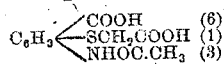

may be obtained as follows: 110 gr. of acetaminoanthranilic acid

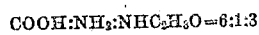

are dissolved in 50 gr. of sodium hydrate and water. After adding 150 c. c. of concentrated hydrochloric acid and ice the solution is diazotized with 35 gr. of sodium nitrite. The diazo solution is run at about 70–75° C in an aqueous solution of 100 gr. of potassium xanthogenate and 200 gr. of sodium carbonate; the filtered solution is treated with 75 gr. of chloracetic acid dissolved in about 90 gr. of caustic soda and water and boiled for some hours. After filtration the solution is precipitated with hydrochloric acid, whereupon the meta-acetamidophenylthioglycollic-ortho-carboxylic acid is precipitated as a yellowish powder.

The melt is made, for instance, as follows:—30 parts by weight of this acid are introduced at about 100° C. into 180 parts by weight of caustic soda liquefied with about 30 parts or more of water. The temperature is gradually raised while stirring to 170° C. till the melt becomes brittle. The condensation begins already at 130° C., at this temperature, however, more time is needed for the completion of the melt. The operation may also occur by using less alkali or under pressure. The product of condensation may be isolated in various ways. Thus, for instance, stirring may occur with little water; the sodium salt of meta-amido-oxythionaphthene-carboxylic acid, thus separated, and soluble with difficulty in alkalihydrate, readily soluble in water, is filtered from the excess of the alkalihydrate solution. The product of condensation, meta-amidoöxythionaphthene carboxylic acid, may also be obtained from the aqueous solution of the strongly cooled melt by directly acidifying with acetic acid, when it is precipitated as a crystalline gray powder. It is soluble in an excess of hydrochloric acid in the heat, carbonic acid being evolved on boiling and from the hydrochlorid solution the meta-amidoöxythionaphthene may be precipitated with sodium acetate or bicarbonate as a crystalline powder. It is soluble in hot water and crystallizes when cold. It is soluble in alkalihydrate and in an excess of mineral acid.

The oxidation of the afore-described leuco bodies may be carried out as follows:—30 parts by weight of the above carboxylic acid or of meta-amidoöxythionaphthene are dissolved in the heat with 30 parts by weight of soda-lye in 2000 parts by weight of water, the solution being then treated with air at about 70–80° C. till no further meta-amido-oxythionaphthene carboxylic acid can be traced in the filtrate of the separated dyestuff.

The operation may also occur by oxidizing in a neutral or in an alkalicarbonate-alkaline suspension instead of in a very dilute caustic alkali solution or even by directly using the sodium salt of meta-amido-oxythionaphthene carboxylic acid obtained by treating the melt with limited quantities of water and separating from the concentrated alkali solution. The oxidation may also be carried out with ferric salts, potassium ferri-cyanid and the like in neutral or feebly alkaline solution.

The dyestuff separated in brown flakes by one or the other method is isolated from the mother lye by filtration and may be purified from small inter-mixtures by boiling with alcohol. When dry, it is a brown powder, insoluble in water, alkalies, dilute acids, soluble in concentrated sulfuric acid with a blue color, soluble with great difficulty in hot nitrobenzene with an orange-brown color; it is reduced to a leuco compound by alkaline reducing agents, for instance, an alkaline hydrosulfite solution and dyes from this solution cotton and wool brown shades.

Having now described my invention, what I claim is:—

As product, the brown vat dyestuff having the formula:

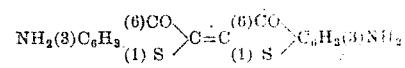

being insoluble in water, alkalies, dilute acids, soluble in concentrated sulfuric acid with a blue color, forming with alkaline hydrosulfite a yellowish-brown vat from which wool and cotton are dyed brown shades.

In testimony, that I claim the foregoing as my invention, I have signed my name in presence of two subscribing witnesses.

ALBRECHT SCHMIDT.

Witnesses:
 JEAN GRUND,
 CARL GRUND.